(12) United States Patent
Maass et al.

(10) Patent No.: US 11,750,399 B2
(45) Date of Patent: Sep. 5, 2023

(54) CYBER-SECURITY PROTOCOL

(71) Applicant: MOTIONAL AD LLC, Boston, MA (US)

(72) Inventors: Michael Maass, Pittsburgh, PA (US); Karl Robinson, Norwell, MA (US); Lucky Munro, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 189 days.

(21) Appl. No.: 17/104,482

(22) Filed: Nov. 25, 2020

(65) Prior Publication Data

US 2021/0176071 A1     Jun. 10, 2021

Related U.S. Application Data

(60) Provisional application No. 62/944,987, filed on Dec. 6, 2019.

(51) Int. Cl.
| | |
|---|---|
| *H04L 9/08* | (2006.01) |
| *H04L 9/32* | (2006.01) |
| *H04W 4/46* | (2018.01) |
| *H04W 12/041* | (2021.01) |
| *H04W 12/033* | (2021.01) |
| *H04L 9/14* | (2006.01) |

(Continued)

(52) U.S. Cl.
CPC .......... *H04L 9/3247* (2013.01); *H04L 9/0869* (2013.01); *H04L 9/14* (2013.01); *H04W 4/46* (2018.02); *H04W 12/033* (2021.01); *H04W 12/041* (2021.01); *H04W 12/06* (2013.01); *G01C 21/28* (2013.01); *H04L 2209/84* (2013.01)

(58) Field of Classification Search
CPC ........ H04L 9/3247; H04L 9/0869; H04L 9/14
See application file for complete search history.

(56) References Cited

U.S. PATENT DOCUMENTS 5,483,596 A *  1/1996  Rosenow ................. H04L 9/40
                                                                  726/3
9,705,678 B1 *  7/2017  Wang ..................... G06F 21/602
(Continued)

OTHER PUBLICATIONS

Woo et al. A Practical Wireless Attack on the Connected Car and Security Protocol for In-Vehicle CAN Apr. 2015 IEEE Transactions on Intelligent Transportation Systems, vol. 16, No. 2 (Year: 2015).*

(Continued)

*Primary Examiner* — David J Pearson
(74) *Attorney, Agent, or Firm* — Knobbe Martens Olson & Bear LLP

(57) ABSTRACT

This disclosure describes a cyber-security protocol for validating messages being exchanged between two devices of an autonomous vehicle. The protocol includes the independent generation of multiple encryption or session keys by both devices. The encryption keys are generated based on a random number provided by each device. In some embodiments, the random numbers can be accompanied by a shared secret key installed on both devices that can help prevent an unauthorized device from creating a shared set of encryption keys with one of the devices. Including a hash generated using one of the encryption keys and a message sequence counter value in each message can help prevent the injection of previously transmitted messages as a means of disturbing operation of the autonomous vehicle.

22 Claims, 17 Drawing Sheets

(51) Int. Cl.
*H04W 12/06* (2021.01)
*G01C 21/28* (2006.01)

(56) References Cited

U.S. PATENT DOCUMENTS

| | | | |
|---|---|---|---|
| 9,715,678 B2 | 7/2017 | Mill et al. | |
| 2012/0155645 A1* | 6/2012 | Prochaska | H04L 9/12 380/278 |
| 2015/0188704 A1 | 7/2015 | Takenaka et al. | |
| 2018/0126954 A1* | 5/2018 | Haga | B60R 25/307 |
| 2019/0109716 A1 | 4/2019 | Mizoguchi et al. | |
| 2020/0007319 A1* | 1/2020 | Herzerg | H04L 63/062 |
| 2020/0112439 A1* | 4/2020 | Kalaiselvam | H04L 9/3234 |
| 2020/0369242 A1 | 11/2020 | Komedani | |
| 2022/0046114 A1* | 2/2022 | Entelis | H04L 69/08 |

OTHER PUBLICATIONS

Kurachi et al. CaCAN—Centralized Authentication System in CAN (Controller Area Network) Nov. 2014 Embedded Security in Cars(escar) Europe 2014 (Year: 2014).*

Korean Office Action issued for Application No. KR 10-2020-0167495, dated Nov. 29, 2022.

"Diffie-Hellman key exchange", Wikipedia, last edited Dec. 1, 2018, in 7 pages. URL: https://en.wikipedia.org/w/index.php?title=Diffie%E2%80%93Hellman_key_exchange&oldid=871497052.

"HKDF", Wikipedia, last edited Dec. 13, 2018, in 2 pages. URL: https://en.wikipedia.org/w/index.php?title=HKDF&oldid=873406114.

"HMAC", Wikipedia, last edited Dec. 18, 2018, in 4 pages. URL: https://en.wikipedia.org/w/index.php?title=HMAC&oldid=874237792.

Krawczyk, H. et al., "HMAC-based Extract-and-Expand Key Derivation Function (HKDF)", Internet Engineering Task Force (IETF), May 2010, in 14 pages. URL: https://www.rfc-editor.org/rfc/pdfrfc/rfc5869.txt.pdf.

Menezes, P. et al., "Chapter 12—Key Establishment Protocols", *Handbook of Applied Cryptography*, Oct. 1996, CRC Press, in 54 pages.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Great Britain Office Action issued for Application No. GB 2019064.1, dated Jun. 28, 2021.

Great Britain Office Action issued for Application No. GB 2019064.1, dated Mar. 31, 2022.

Great Britain Office Action issued for Application No. GB 2213570.1, dated Nov. 30, 2022.

Korean Office Action issued for Application No. KR 10-2020-0167495, dated May 29, 2022.

* cited by examiner

CYBER-SECURITY PROTOCOL

CROSS-REFERENCE TO RELATED APPLICATIONS

This application claims the benefit of U.S. Provisional patent Application No. 62/944,987, filed Dec. 6, 2019, entitled "CYBER-SECURITY PROTOCOL," the entire contents of which are hereby incorporated by reference.

FIELD

This description relates to a communication system configured to transmit and receive messages in a secure manner.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings and monitor operation of the autonomous vehicle. Security of the data transmitted from the sensors to one or more processors being used to direct operation of the autonomous vehicle can contribute to safe operation of the autonomous vehicle.

SUMMARY

The subject matter described in this specification is directed to techniques for securely validating or authenticating the origin of messages transmitted between two devices of, e.g., an autonomous vehicle. Generally, the devices are configured to cooperatively generate a table of encryption keys that are used in conjunction with a message counter to securely validate messages transmitted between the devices.

In some embodiments, the technique is performed between a first device and a second device and involves the following steps: performing, using a processing circuit of a second device, a keying operation that includes exchanging randomly generated numbers with the first device and generating encryption keys using the randomly generated numbers; receiving at the second device a first message that includes a first message sequence counter value and a first hash generated using a first encryption key of the plurality of encryption keys; after receiving the first message, receiving a second message at the second device that includes a second message sequence counter value and a second hash generated by the first encryption key; in accordance with a determination that the second message sequence counter value is greater than the first message sequence counter value, authenticating the second message as having been received from the first device; after receiving the second message, receiving a third message that includes a third message sequence counter value and a third hash generated by a second encryption key of the plurality of encryption keys; and in accordance with a determination that the third message sequence counter value is less than the second message sequence counter value and the second encryption key used to generate the third hash is different than the first encryption key, authenticating the third message as having been received from the first device.

These and other aspects, features, and implementations can be expressed as methods, apparatuses, systems, components, program products, means or steps for performing a function, and in other ways.

These and other aspects, features, and implementations will become apparent from the following descriptions, including the claims.

DETAILED DESCRIPTION

Figure 1:
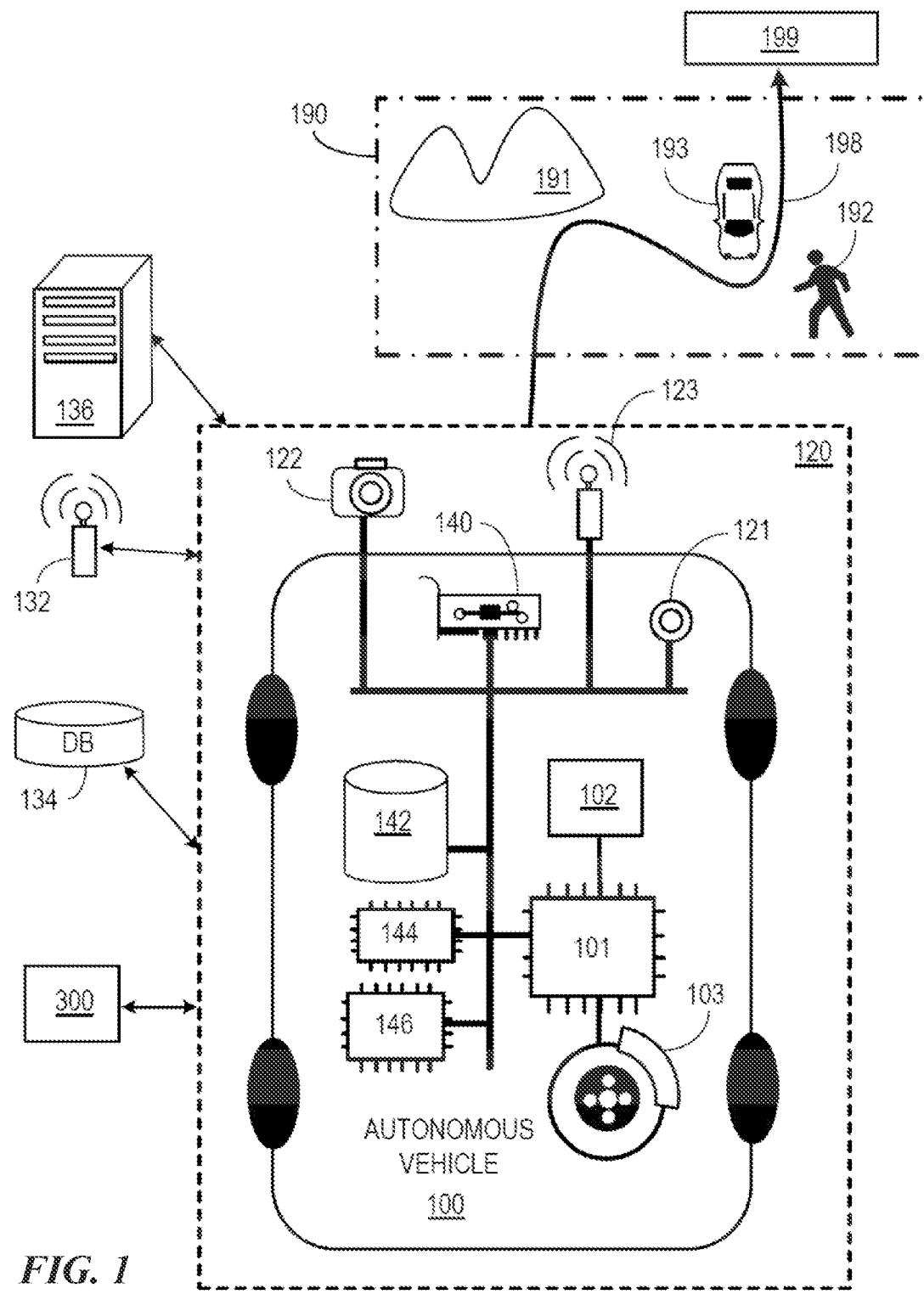
FIG. 1 shows an example of an autonomous vehicle having autonomous capability.

In the following description, for the purposes of explanation, numerous specific details are set forth in order to provide a thorough understanding of the present disclosure. It will be apparent, however, that the present techniques may be practiced without these specific details.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Computing System for Object Detection Using Pillars
8. Example Point Clouds and Pillars
9. Example Process for Detecting Objects and Operating the Vehicle Based on the Detection of the Objects General Overview Autonomous vehicles driving in complex environments (e.g., an urban environment) pose a great technological challenge. In order for autonomous vehicles to navigate these environments, the vehicles detect various types of objects such as vehicles, pedestrians, and bikes in real-time using sensors such as LIDAR or RADAR. The sensors then relay sensor data to one or more processors responsible for directing the autonomous vehicle in a series of messages. One approach for assuring the security of the messages is the use of black channel protocols that are known to be used for securing communication over a point-to-point serial data link. Unfortunately, black channel protocols may still be vulnerable to particular types of attacks.

In particular, the system and techniques described herein implement protocols that allow two devices to be assured that any communications exchanged between two devices are actually originating from the two devices. The protocols begin with a keying operation in which the devices exchange random numbers. The random numbers are then used to generate a set of encryption or session keys that are used to validate subsequent communications between the two devices. The random numbers help to prevent anticipation of the encryption keys by introducing an amount of entropy into the generation of the keys. In addition to including a hash generated by one of the generated encryption keys in each message, a message sequence counter value is also included. The message sequence counter value increases after each message is sent. The message sequence counter value can help prevent a bad actor from transmitting old messages that incorporate a hash generated by the current encryption key from being validated. It should be noted that the message sequence counter value cannot be infinitely large and at some point the message sequence counter value is reset. When the message counter resets, the device sending the next message uses a new one of the generated encryption keys to generate a hash of the next message, which in turn can help prevent old messages with higher message sequence counter values from being validated since the hash generated by the preceding encryption key used with the old messages will be recognized as having been generated by the preceding encryption key. In this way, attacks that would in certain cases be successful against black channel protocols can be thwarted.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to a second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
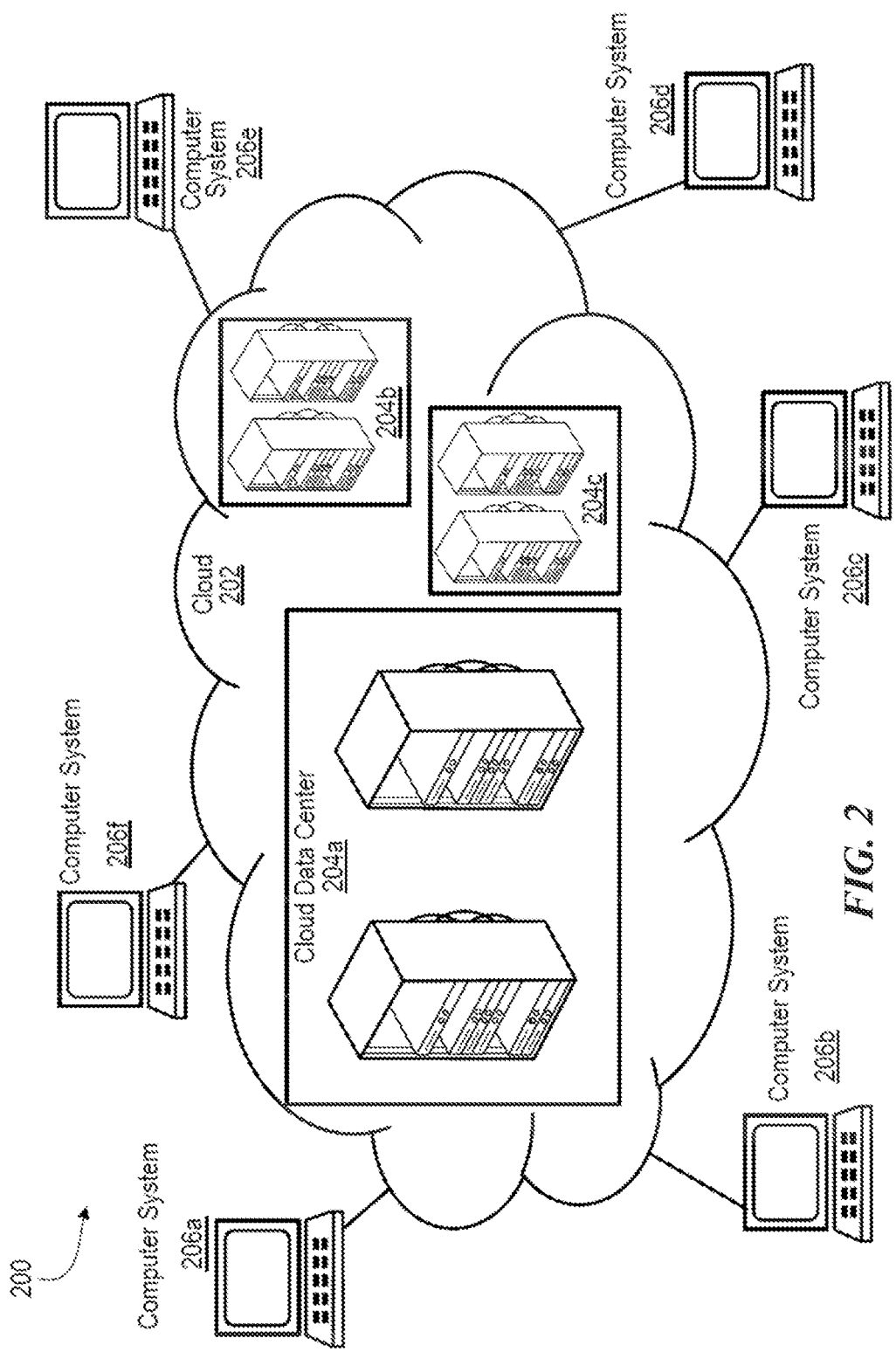
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204*a*, 204*b*, and 204*c* that are interconnected through the cloud 202. Data centers 204*a*, 204*b*, and 204*c* provide cloud computing services to computer systems 206*a*, 206*b*, 206*c*, 206*d*, 206*e*, and 206*f* connected to cloud 202.

The cloud computing environment 200 includes one or more cloud data centers. In general, a cloud data center, for example the cloud data center 204*a* shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204*a* has many computing systems distributed through many racks.

The cloud 202 includes cloud data centers 204*a*, 204*b*, and 204*c* along with the network and networking resources (for example, networking equipment, nodes, routers, switches, and networking cables) that interconnect the cloud data centers 204*a*, 204*b*, and 204*c* and help facilitate the computing systems' 206*a-f* access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206*a-f* or cloud computing services consumers are connected to the cloud 202 through network links and network adapters. In an embodiment, the computing systems 206*a-f* are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
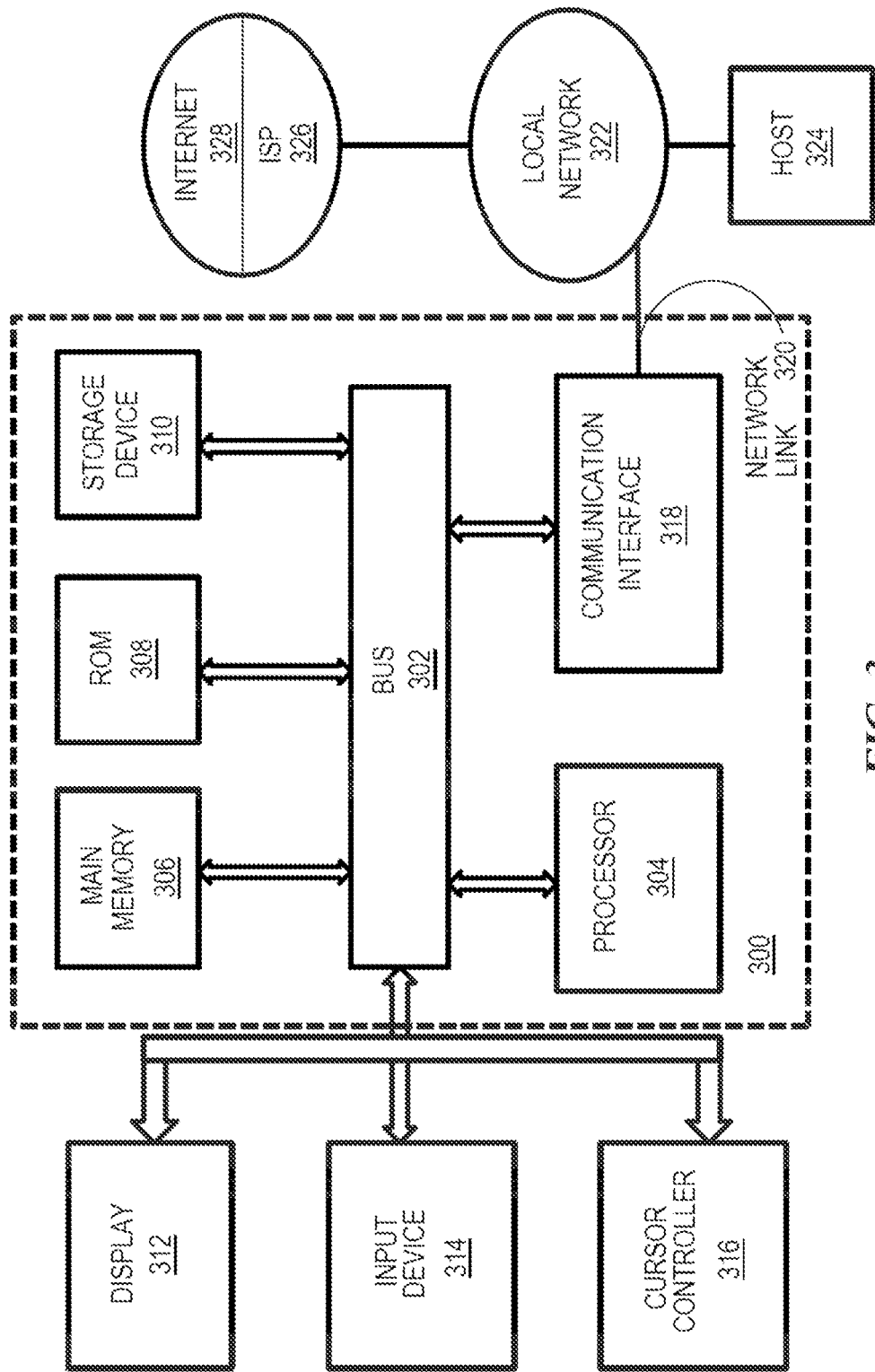
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
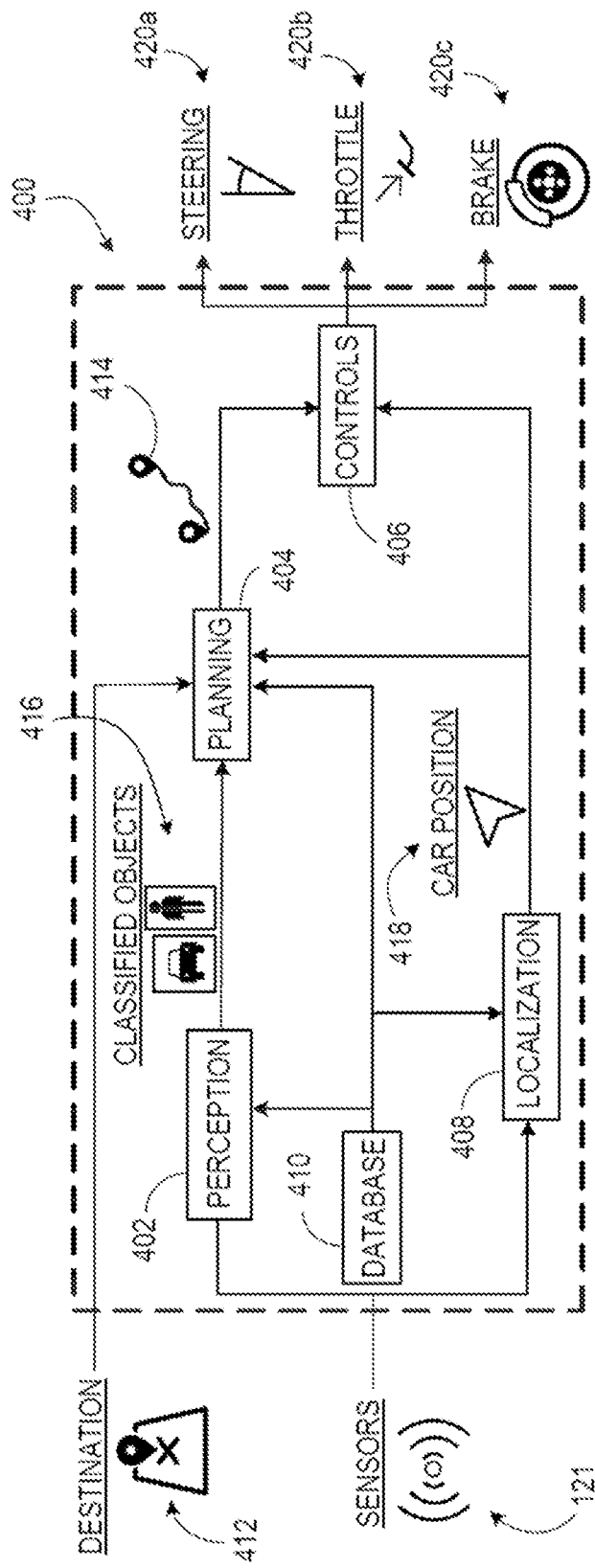
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
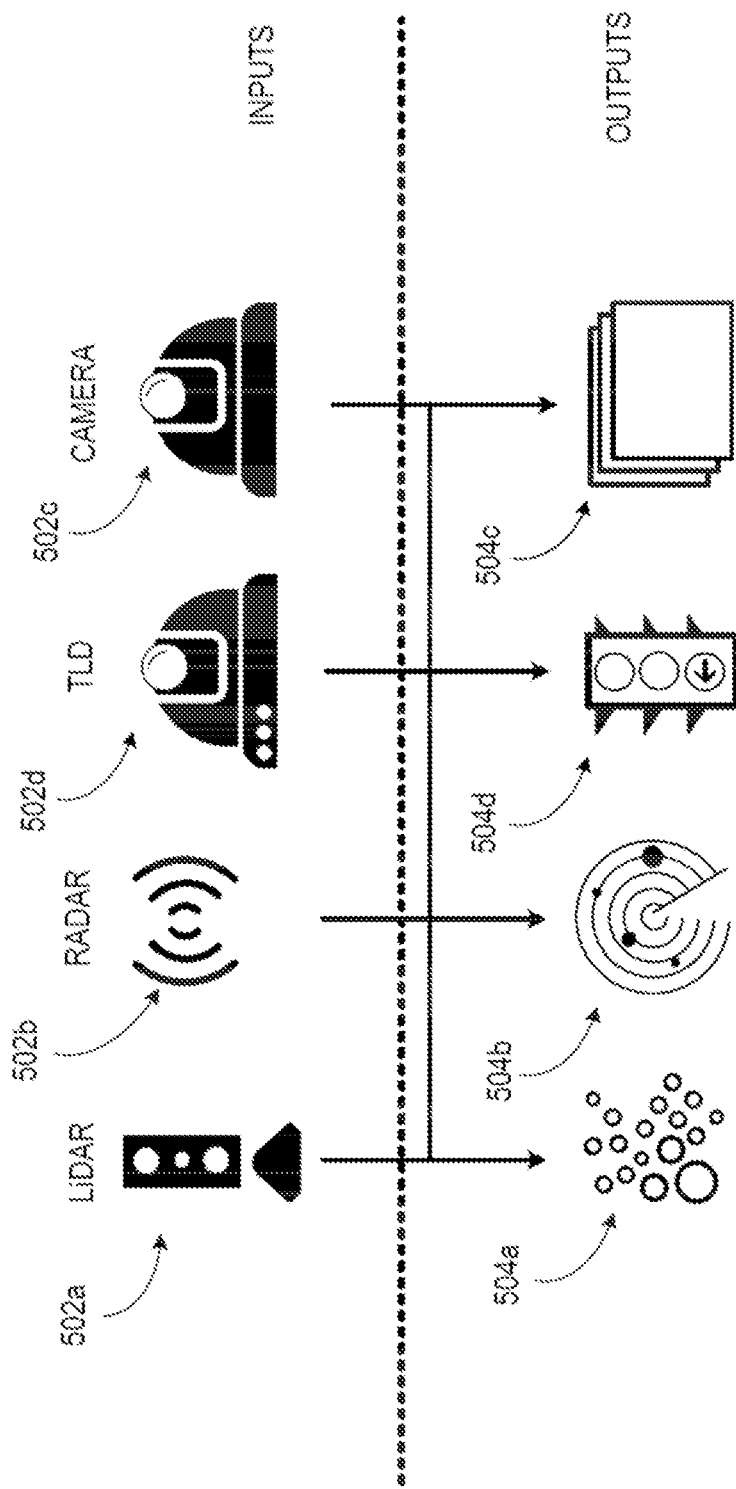
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
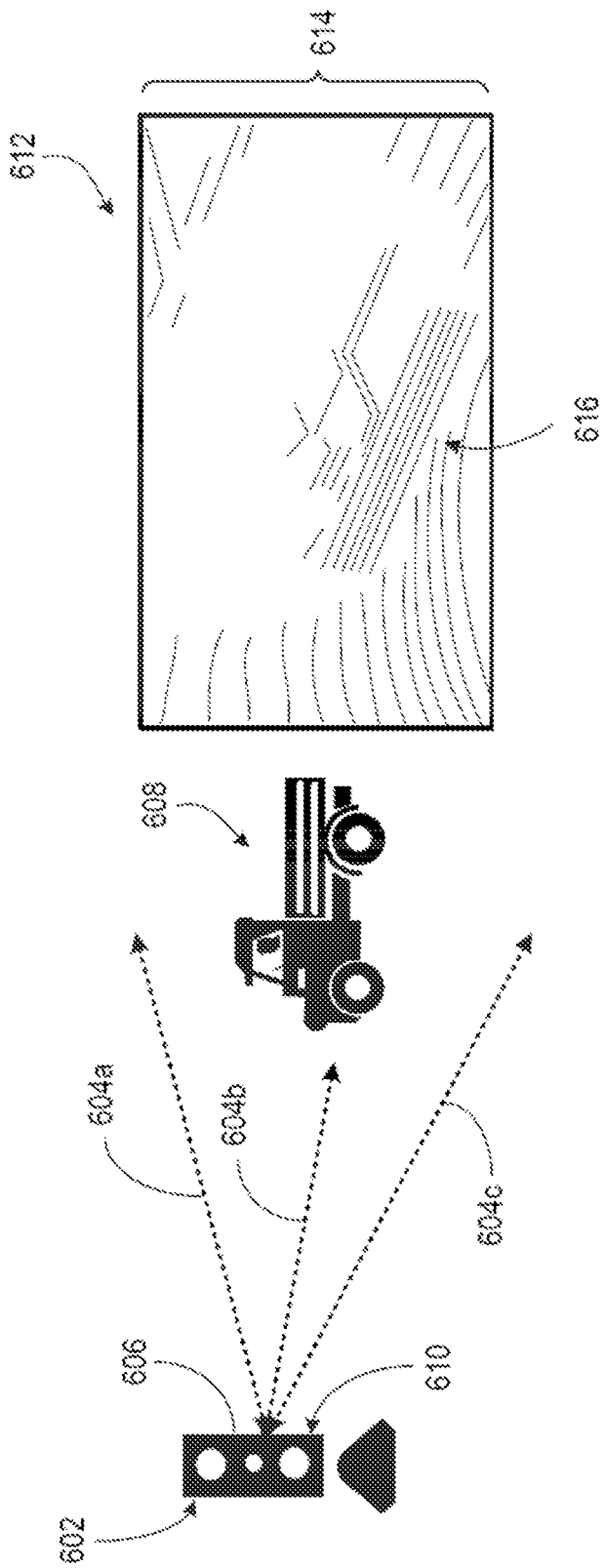
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
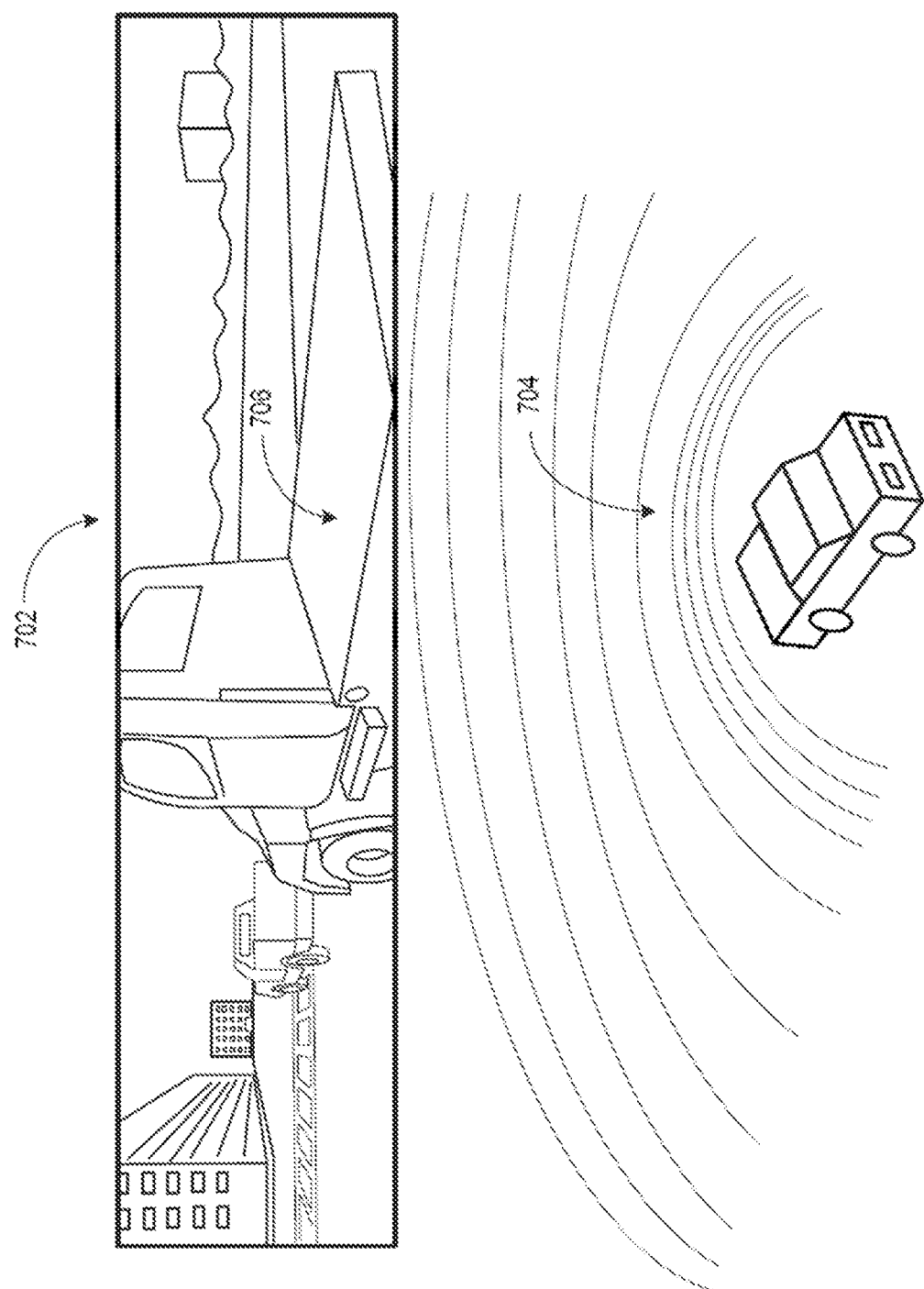
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
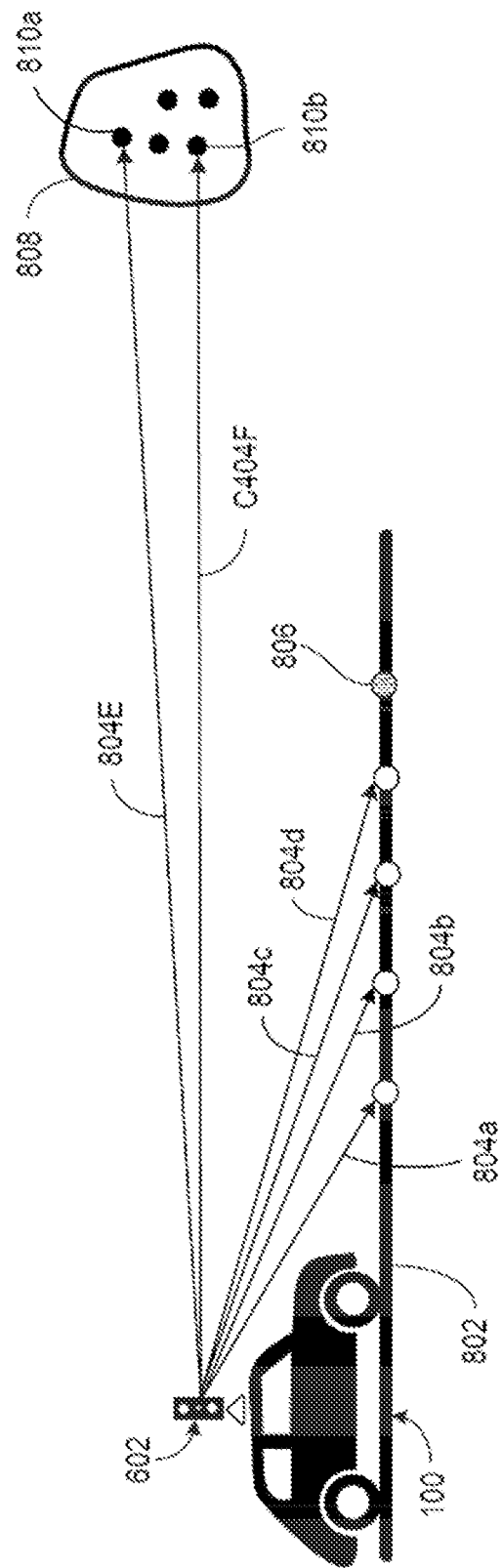
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
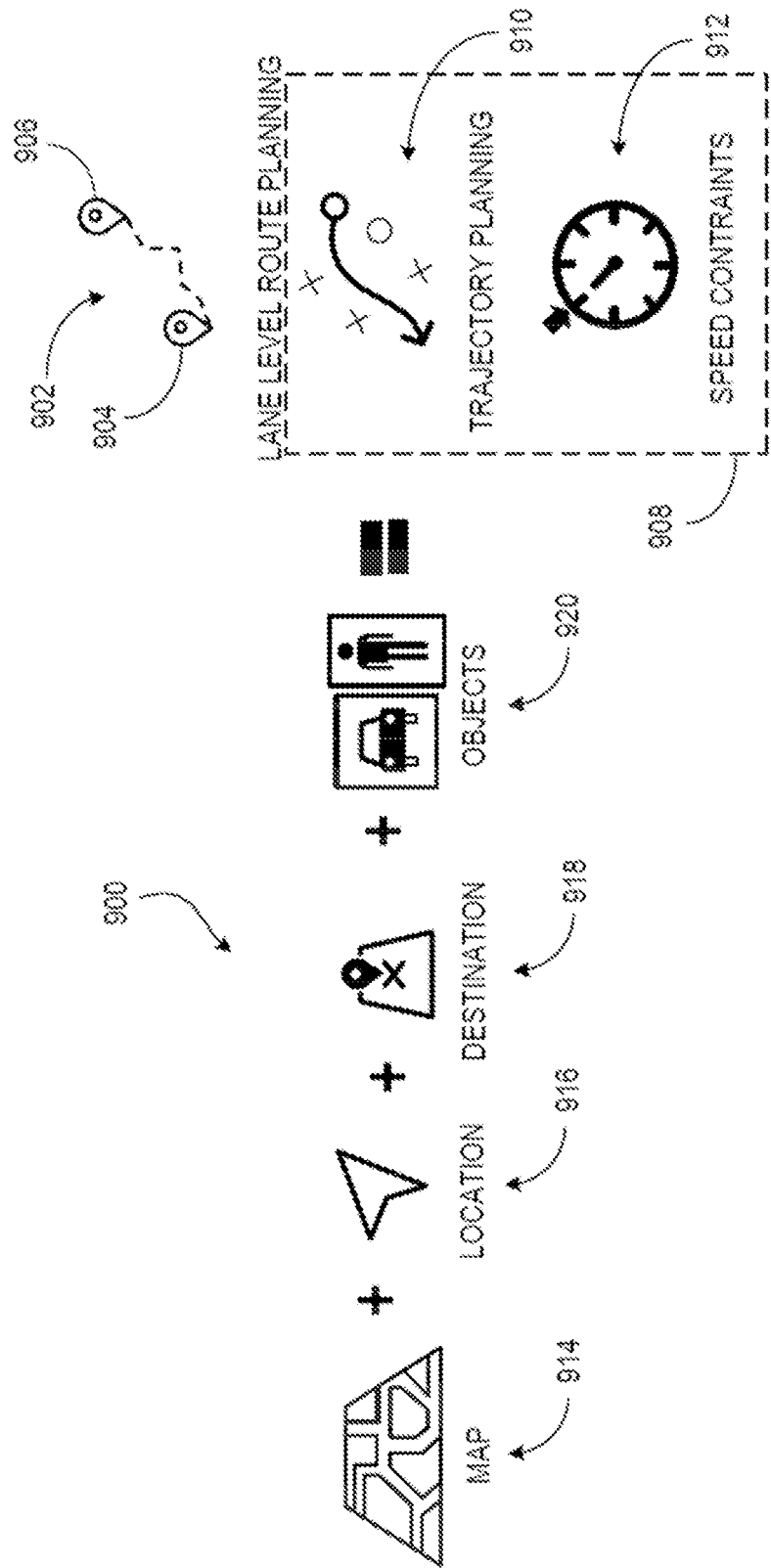
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
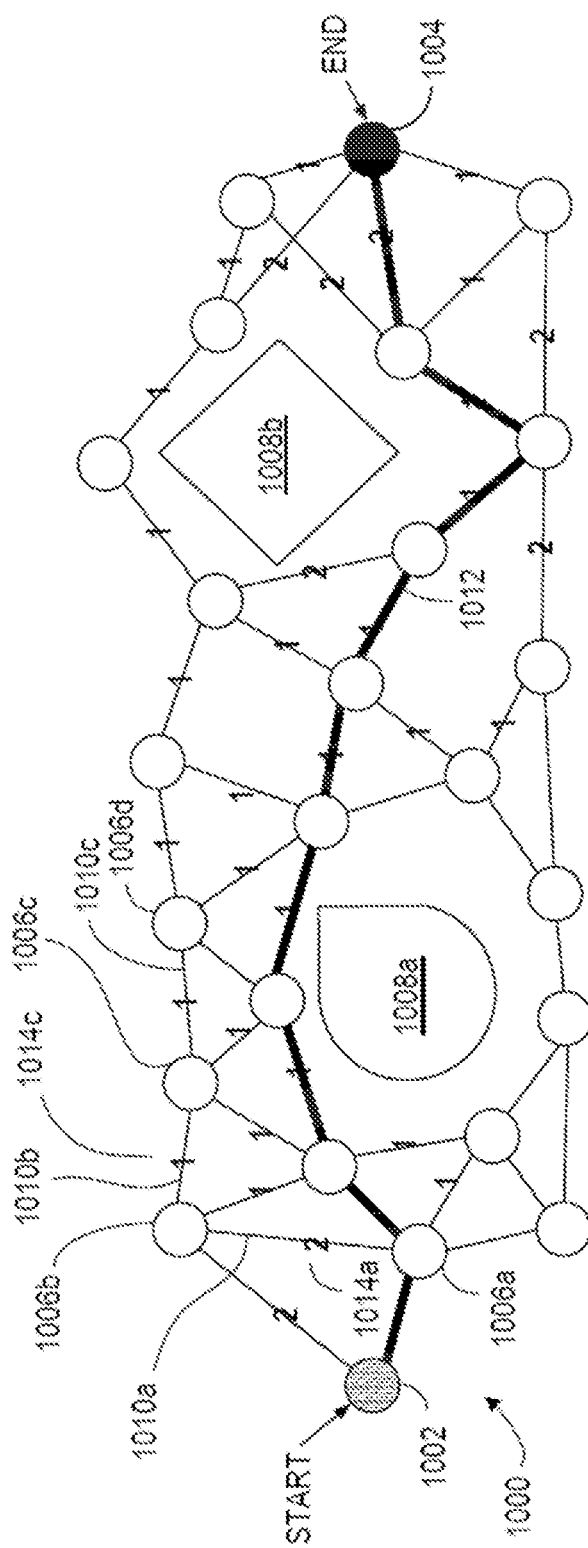
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006*a-d* are distinct from objects 1008*a-b* which cannot overlap with a node. In an embodiment, when granularity is low, the objects 1008*a-b* represent regions that cannot be traversed by automobile, e.g., areas that have no streets or roads. When granularity is high, the objects 1008*a-b* represent physical objects in the field of view of the AV 100, e.g., other automobiles, pedestrians, or other entities with which the AV 100 cannot share physical space. In an embodiment, some or all of the objects 1008*a-b* are a static objects (e.g., an object that does not change position such as a street lamp or utility pole) or dynamic objects (e.g., an object that is capable of changing position such as a pedestrian or other car).

The nodes 1006*a-d* are connected by edges 1010*a-c*. If two nodes 1006*a-b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
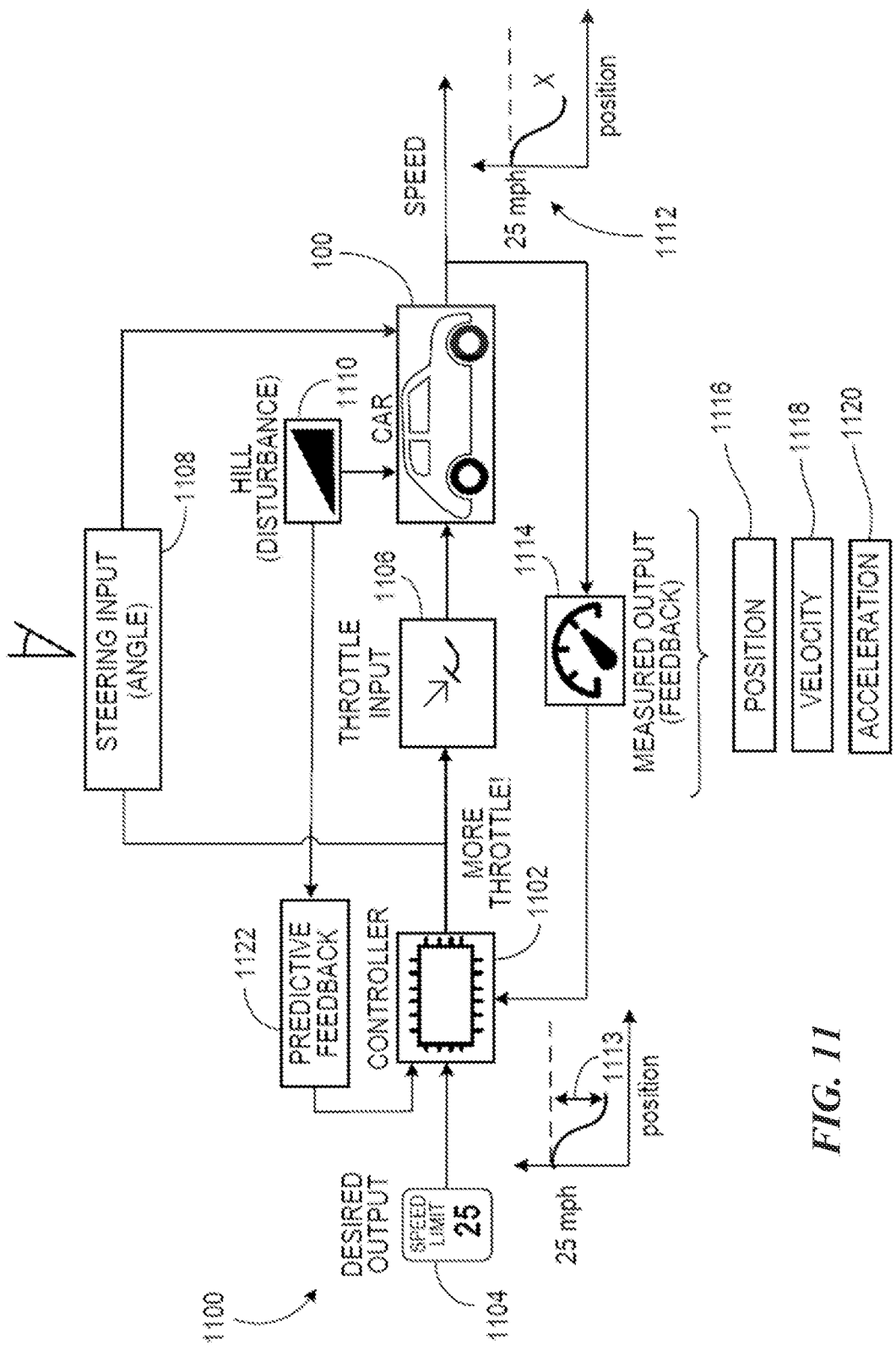
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
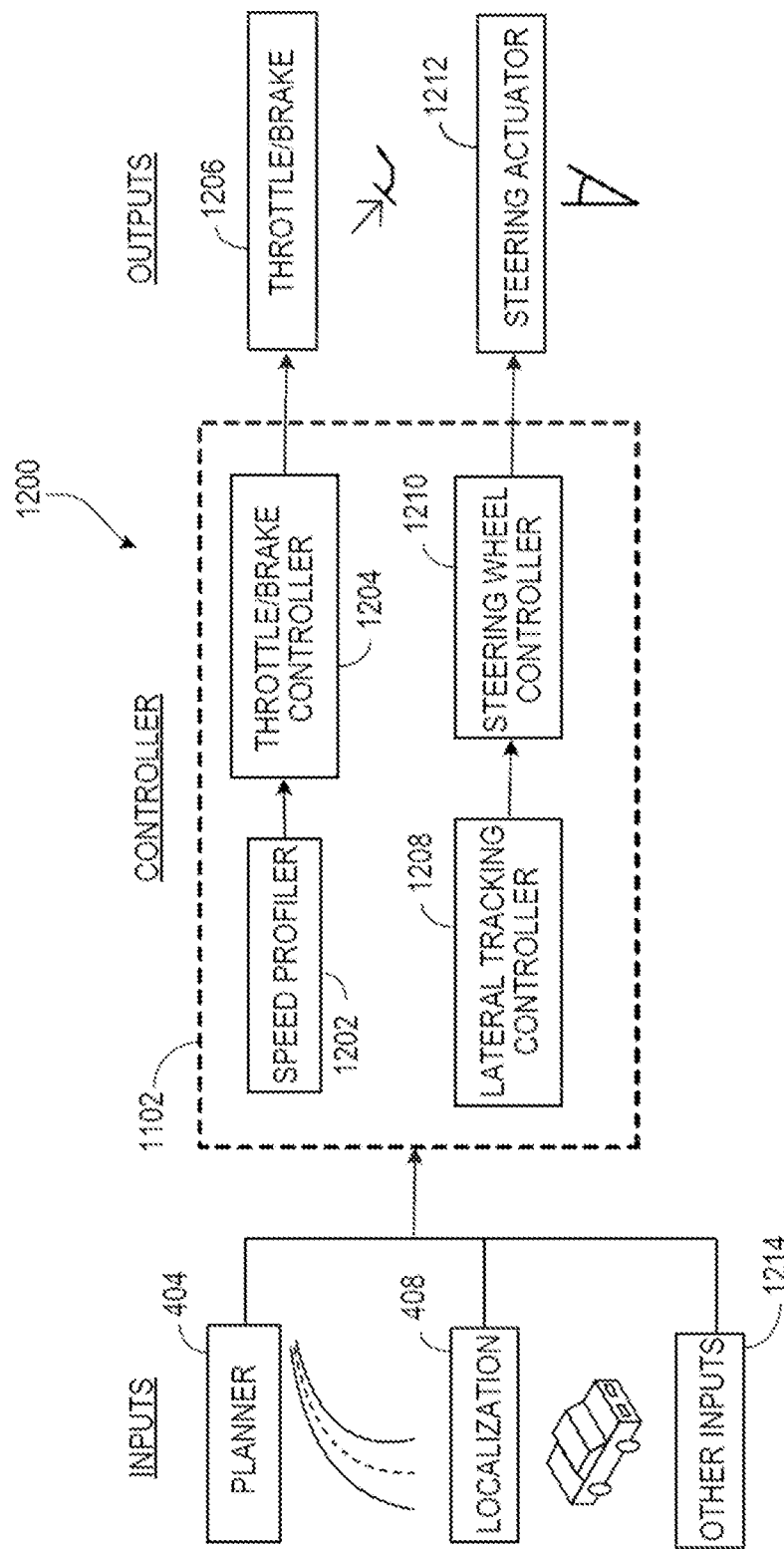
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Figure 13:
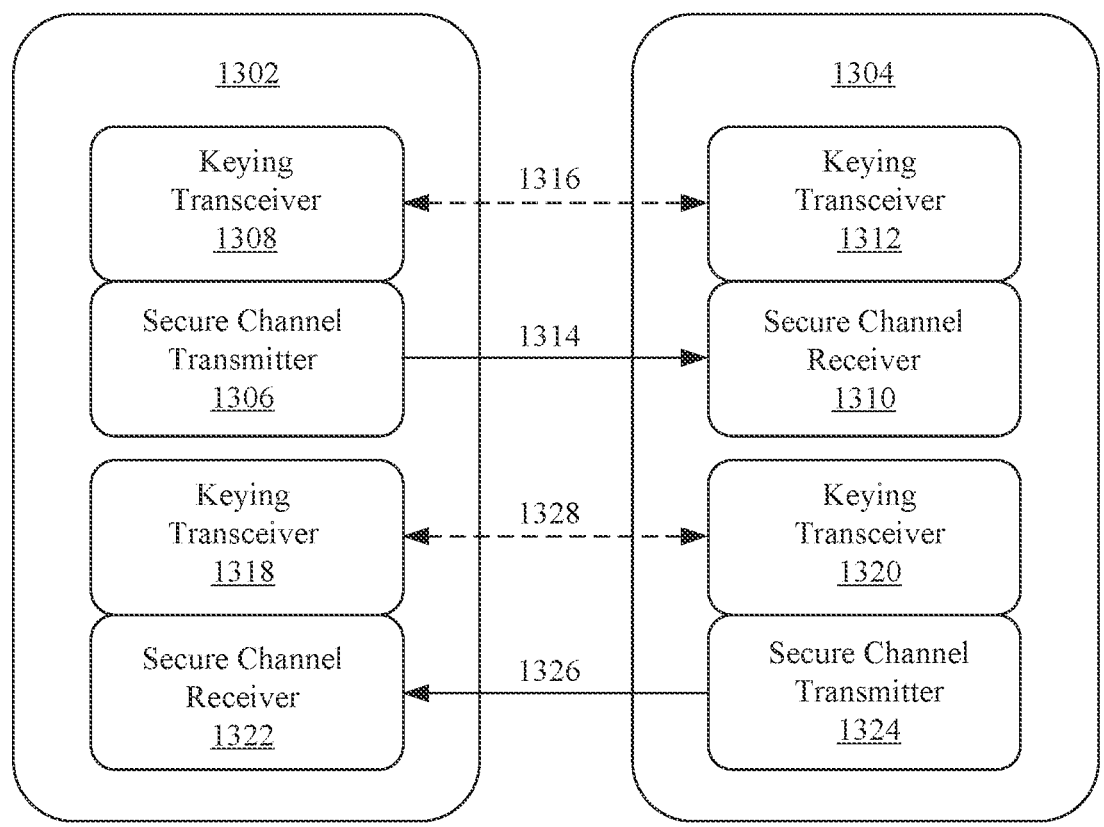
FIG. 13 shows a block diagram of two devices configured to communicate across two separately keyed, unidirectional communication channels.

FIG. 13 shows a set of communications pathways extending between devices 1302 and 1304 of AV 100. In one particular embodiment, device 1302 can take the form of one or more computer processors 146 and device 1304 can take the form of one of sensors 121. Sensors 121, as previously discussed in the context of FIG. 1, are responsible for identifying a state of AV 100 and can be configured to measure metrics such as speed, velocity, acceleration, position and orientation. Sensors 121 can also be configured to identify objects and obstruction nearby AV 100. In some embodiments, the current state includes information about a position of AV 100 on a road, a current speed and direction of AV 100, and a rate of acceleration and/or rotation of AV 100. When computer processor 146 is responsible for directing operation of AV 100, the accuracy and reliability of this state information contributes to the safe operation of AV 100. For at least this reason, FIG. 13 describes a secure two-way communication configuration designed to ensure security of the data exchanged between devices 1302 and 1304.

FIG. 13 also shows how devices 1302 and 1304 are configured to communicate across two separately keyed, unidirectional communication channels. Keying transceivers, sometimes referred to as state machines, of the devices are used to perform independent keying operations for the two unidirectional communication channels. While a specific number of communication channels are described and depicted in FIG. 13, it should be noted that in some embodiments, a smaller or larger number of multi-directional or unidirectional communication channels can be included in the communication configuration. In the depicted configuration, one of the unidirectional communication channels is supported by a secure channel transmitter 1306 of device 1302 associated with a keying transceiver 1308 and a secure channel receiver 1310 of device 1304 associated with a keying transceiver 1312. In some embodiments, keying transceiver 1312 can be configured to start a keying or rekeying operation by initiating an exchange of random numbers with keying transceiver 1308, ultimately resulting in the independent generation of multiple encryption keys at both device 1302 and device 1304. The encryption keys, sometimes referred to as session keys, are then used to secure the transmission of data from secure channel transmitter 1306 to secure channel receiver 1310. Secure communication channels 1314 and 1316 can be communications lines taking the form of, e.g., copper or fiber optic cables. Keying transceivers 1318 and 1320 can be configured to independently perform another keying operation that secures communication between secure channel receiver 1322 and secure channel transmitter 1324 over secure communication channel 1326.

Communication channels 1314, 1316, 1326 and 1328 can run directly between components, thereby reducing the likelihood of any signal interrupt. Furthermore, by routing the keying communications over different lines than the actual data communication, a bad actor wishing to send and receive false data to either of the devices would need to connect to communication channels 1314, 1316, 1326 and 1328 in order to obtain all the data needed to understand how communications are being routed. As will be described in greater detail below, transmission of false messages to device 1302 or device 1304 by an unauthorized device is even more difficult in configurations where the first device 1302 and second device 1304 include a shared secret key installed during manufacture of the autonomous vehicle. Common forms of attack that can be prevented by the embodiments described herein are the use of fake or repeated encryption keys and the use of man in the middle attacks where an unauthorized machine is able to intercept and make adjustments to messages, generally leading to degraded performance of the autonomous vehicle.

Figure 14:
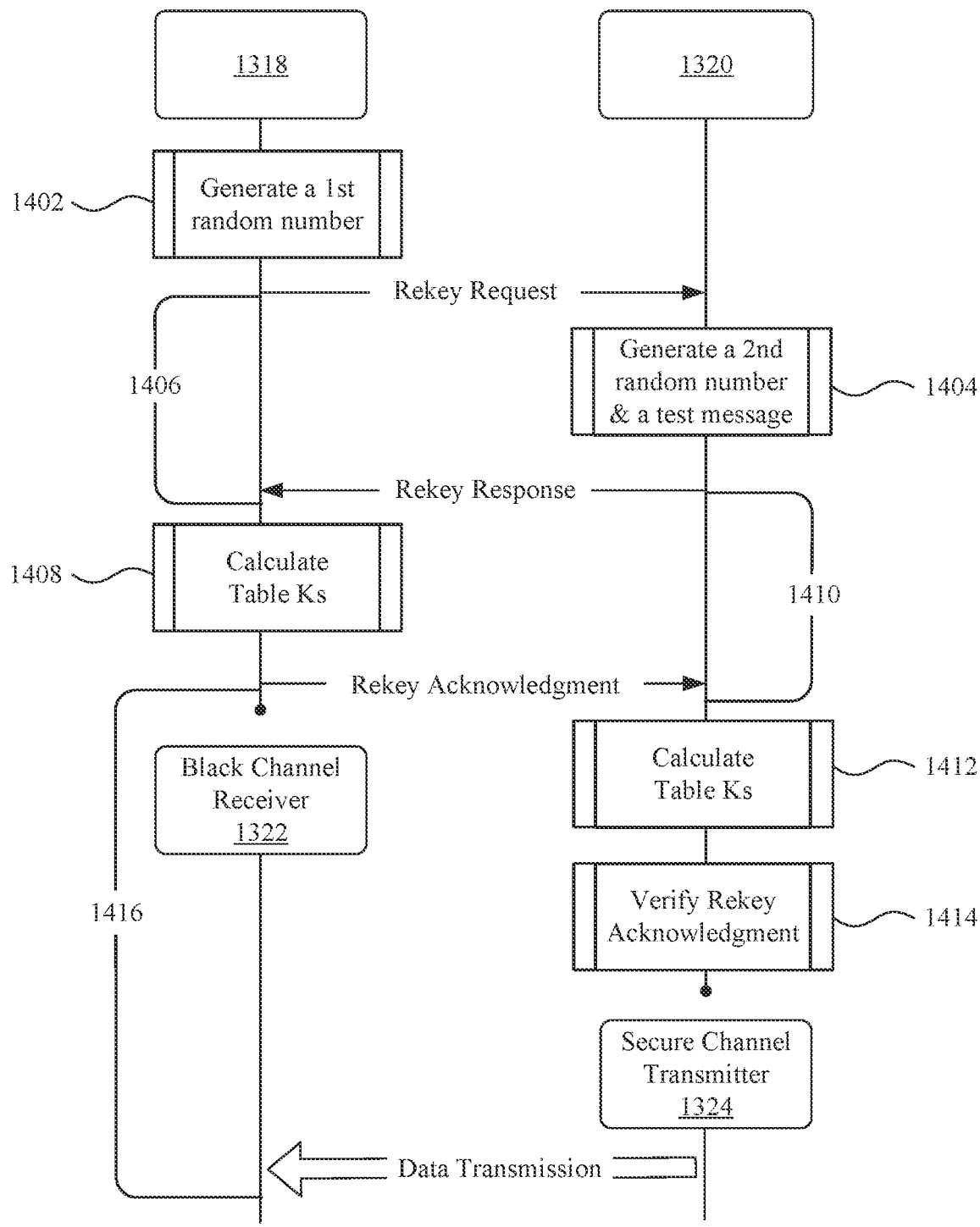
FIG. 14 shows a flow chart illustrating a series of steps taken by keying transceivers of the devices depicted in FIG. 13 to generate encryption keys during a keying operation.

FIG. 14 shows a flow chart illustrating a series of steps taken by keying transceivers 1318 and 1320 to generate encryption keys during a keying operation. In the example depicted in FIG. 14, at 1402, keying transceiver 1318 initiates the keying operation by generating a first random number and then sending a rekey request that includes the first random number to keying transceiver 1320. At 1404, keying transceiver 1320 generates a second random number and a test message that in some embodiments takes the form of another randomly generated number, sometime referred to as a nonce. The second random number and test message are then sent to keying transceiver 1318 as a rekey response. While keying transceiver 1320 has the two random numbers for generating a table of encryption keys at this point, the encryption key generation operation can be delayed to reduce processing cycles where an attempt to send false keying or rekeying messages is being made. A rekey response should be received at keying transceiver 1318 before the expiration of a first window of time 1406 initiated, in some embodiments, by the transmission of the rekey request. In the case where no rekey response is received by keying transceiver 1318 prior to the expiration of first window of time 1406, keying transceiver 1318 is configured to restart the keying procedure by generating and sending a new random number as a rekey request to keying transceiver 1320.

When the rekey response is received by keying transceiver 1318 prior to the expiration of first window of time 1406, the keying operation continues at 1408 where keying transceiver 1318 or a processor of device 1302 associated with keying transceiver 1318 can be configured to use the first and second randomly generated numbers to generate a table Ks that includes multiple encryption keys. In some embodiments, generation of table Ks can be performed using a hashing protocol known as HMAC-based Extract-and-Expand Key Derivation Function (HKDF). This protocol uses the two randomly generated numbers as well as a shared secret key stored in the memory of both device 1302 and device 1304 to generate the encryption keys. The shared secret key can be stored in a secure memory module/enclave of each device during initial manufacture of AV 100. In some embodiments, the table Ks can include 255 different encryption keys. In some embodiments, table Ks can be populated with a larger or smaller number of encryption keys.

A first one of the encryption keys, Ks[0] from the table Ks, is used to compute a hash of the test message received from keying transceiver 1320. In some embodiments, the hash can take the form of an HMAC digest appended to the end of the test message. The test message is sent along with the hash of the test message to keying transceiver 1320 as a rekey acknowledgement. At this point device 1302 brings secure channel receiver 1322 online to prepare for transmissions from secure channel transmitter 1324. In cases where the rekey acknowledgment is not sent within a second window of time 1410, the keying operation can be abandoned. In cases where the rekey acknowledgment is sent within second window of time 1410, keying transceiver 1320 proceeds to 1412 at which time keying transceiver 1320 independently calculates the same table Ks generated by keying transceiver 1318. It should be noted that windows of time 1406 and 1410 are generally discrete from each other and will not overlap due to the sequential nature of the keying/rekeying operation.

At 1414, keying transceiver 1320 can be configured to then confirm it has correctly calculated the table Ks by comparing the received hash of the test message with a hash of the test message it independently generates using a key Ks[0] from its newly generated table Ks. When the hash values match, a message sequence counter can be set to zero and secure channel transmitter 1324 begins data transmissions to secure channel receiver 1322 prior to the expiration of a third period of time 1416. Failure to begin transmission prior to the expiration of third period of time 1416 results in a rejection of the data transmission and restart of the keying operation. Each data transmission from secure channel transmitter 1324 to secure channel receiver 1322 can include a hash of the message being sent that is generated using one of the encryption keys from the table Ks, a message sequence counter value, and the substantive data that is being exchanged between devices 1302 and 1304. The substantive data portion of the message can be transmitted in an encrypted or unencrypted state. In some embodiments, the message sequence counter is based on a 32-bit register that allows for unique message sequence counter values to be assigned for over four billion transmissions. A hash of each new message generated using a new one of the encryption keys from the table Ks can be input into the new messages after the message sequence counter resets to avoid the situation in which old messages with matching counter values can be re-transmitted to bypass security measures. Each span of time during which a single encryption key is used, the duration of which can vary based on the frequency of messages being exchanged or on events unrelated to the number of messages exchanged that lead to the initiation of a rekey operation, can be referred to as an epoch.

While the aforementioned operation described in reference to FIG. 14 is generally referred to as a keying operation, this series of steps can also be used to perform a rekeying operation performed to update the encryption keys stored in table Ks. In some embodiments, a failure to update the keys could result in a cancellation of the rekeying operation and continued use of the existing encryption keys. One or more events could take place to justify the rekeying operation. For example, each time a new user begins use of AV 100 a rekeying operation could be initiated. Other reasons for performing a rekeying operation include the startup of AV 100, and the exhaustion of all the generated encryption keys in the table Ks.

Figure 15A:
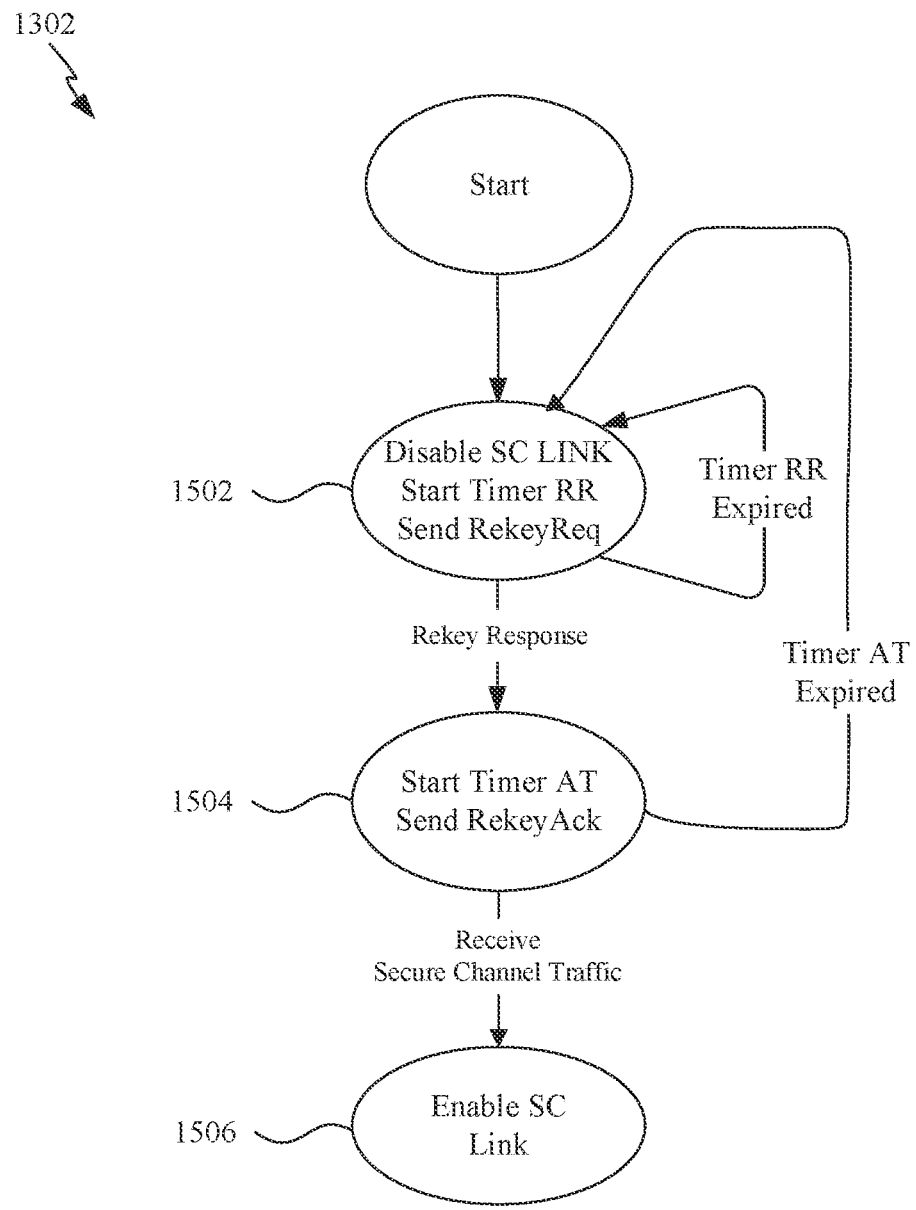
FIG. 15A shows a series of operations performed from the perspective of a first one of the devices depicted in FIG. 13.

FIG. 15A shows a series of operations performed from the perspective of device 1302. Keying transceiver 1318, as described in the text accompanying FIG. 14, is responsible for initiating a keying operation that generates keys configured to validate communications sent from secure channel transmitter 1324 to secure channel receiver 1322. In some embodiments, keying transceiver 1312 is responsible for initiating a keying or rekeying operation to establish communications from secure channel transmitter 1306 to secure channel receiver 1310. By configuring the system in this manner device 1302 and 1304 are both responsible for initiating communications across one of secure communication channels 1314 and 1326.

At 1502, device 1302 is configured to disable the transmission of data over secure communication channel 1326, initiate a rekey request timer corresponding to first window of time 1406 and transmit a rekey request to second device 1304 to begin a keying operation. Expiration of the rekey request timer results in repetition of 1502 until a rekey response is received during the pendency of the rekey request timer. Receipt of a properly validated rekey response within the pendency of the rekey response timer results in device 1302 proceeding to 1504. At 1504, device 1302 begins an acknowledgement timeout timer and transmits a rekey acknowledgement to device 1304. At 1506, after receiving secure channel traffic from device 1304 across secure communication channel 1326 prior to the expiration of the acknowledgment timeout timer, device 1302 enables the transmission of traffic across secure communication channel 1326. If traffic is not received prior to the expiration of the acknowledgment timeout timer, device 1302 returns to 1502.

Figure 15B:
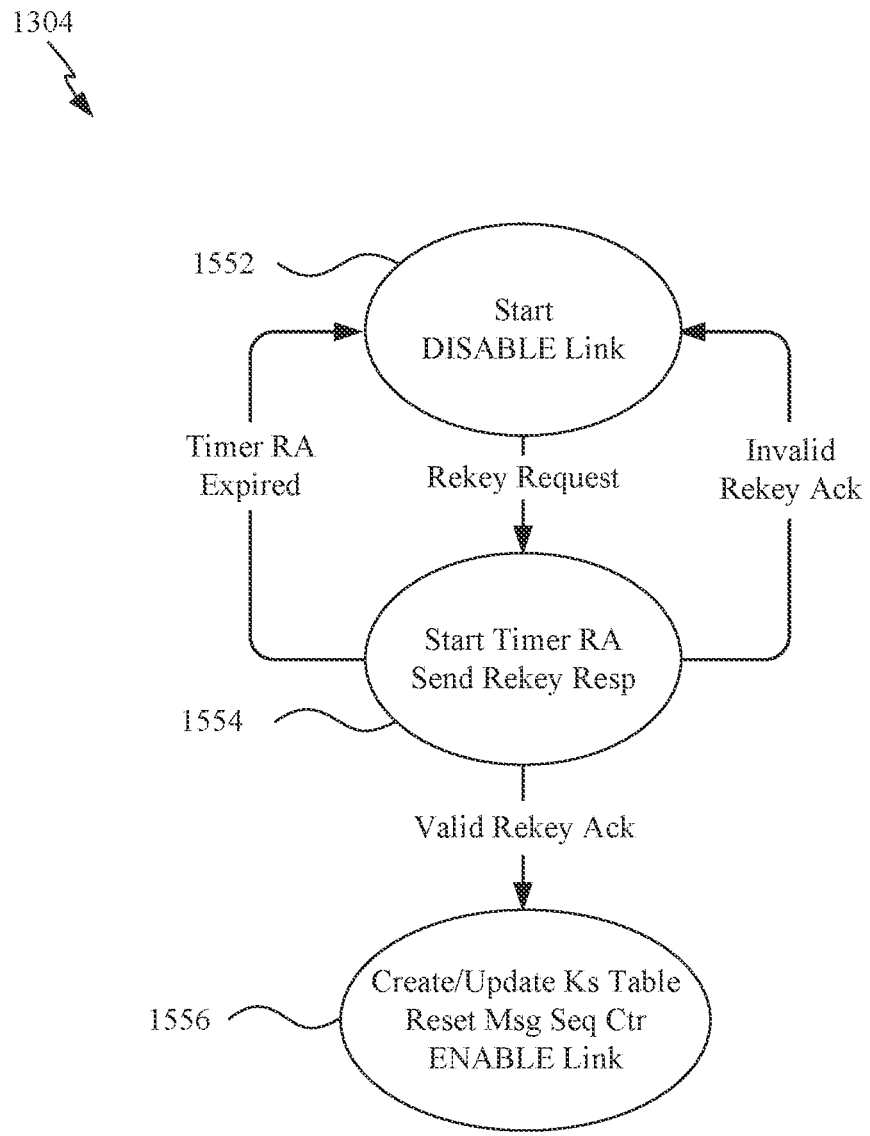
FIG. 15B shows a series of operations performed from the perspective of a second one of the devices depicted in FIG. 13.

FIG. 15B shows a series of operations performed from the perspective of device 1304. Keying transceiver 1320, as described in the text accompanying FIG. 14, is responsible for receiving a keying or rekeying request from keying transceiver 1318 of device 1302. Prior to receiving the keying or rekeying request at 1552, the link between devices 1302 and 1304 can be disabled. Once a rekey request is received from device 1302, at 1554 device 1302 initiates a rekey acknowledgment timer and sends a rekeying response back to device 1302. When a rekey acknowledgment is not received within a window of time defined by the rekey acknowledgment timer, device 1304 returns to 1552 until a new rekey request is received from device 1302. Device 1304 will also return to 1552 in response to a determination that a rekey acknowledgment received before the expiration of the rekey acknowledgment timer is invalid. The rekey acknowledgment can be determined to be invalid in a number of different ways. A randomly generated test message originally sent in the rekey response can be checked to confirm the randomly generated test message included in the rekey acknowledgment is the same. In some embodiments, device 1304 will proceed to 1556 and create or update the table Ks prior to fully authenticating/validating the rekey acknowledgment. An encryption key from the table Ks independently generated by device 1304 can be used to validate an encryption key Ks[0] used to generate a hash that is included in the rekey acknowledgment as a way to confirm the rekey acknowledgment was sent by device 1302 and that the table Ks generated by device 1302 matches the table Ks generated by device 1304. In some embodiments, devices 1302 and 1304 may cease the keying operation if an attack is determined to be a denial of service type attack. In such a case the autonomous vehicle could be required to operate in a reduced functionality mode or completely suspend autonomous operations depending on the importance of the data being exchanged.

Figure 16:
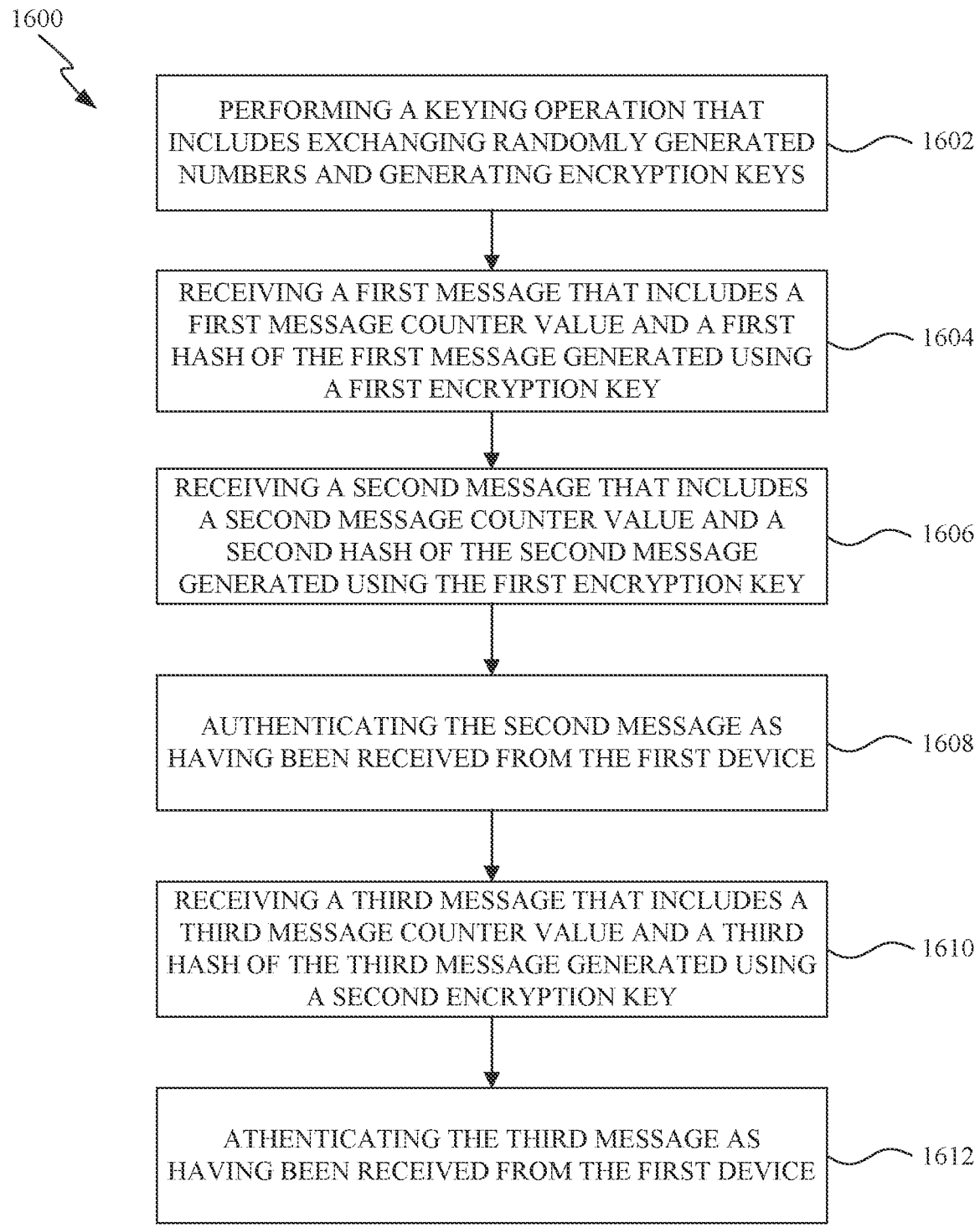
FIG. 16 is a flow chart of an example process for authenticating communications between two devices.

Example Process for Validating Messages Exchanged between a First Device and a Second Device of an Autonomous Vehicle FIG. 16 is a flow chart of an example process 1600 for validating secure communications between two devices. For convenience, the process 1600 will be described as being performed by a system of one or more computers located in one or more locations. For example, devices 1302 and 1304 of FIG. 13, appropriately programmed in accordance with this specification, can perform process 1600. At 1602, device 1302 is configured to perform a keying operation that includes exchanging randomly generated numbers and generating encryption keys. The keying operation includes the exchange of a first number randomly generated by a first device (e.g., 1302) and a second number randomly generated by a second device (e.g., 1304). In some embodiments, the transmissions of the first and second random numbers are accompanied by a shared secret key that is known only to the first and second devices to prevent an outside entity (e.g., a bad actor) from trying to initiate communications with either of the first device and the second device. The exchanged random numbers are then used by both the first and second devices to each independently generate a table of encryption keys. At 1604, a first message that includes a first message sequence counter value and a first hash generated by a first encryption key from the table of encryption keys is received by the first device. The first device can validate the first message by confirming the first hash generated was generated by the first encryption key from the table of encryption keys it generated using the random numbers. The first device stores at least the message sequence counter value into temporary memory. The stored message sequence counter value allows the first device to subsequently generate messages with incrementally higher message sequence counter values and to reject any messages with counter values lower than the message sequence counter value attached to the first message as being an attempt to re-send old messages.

At 1606 of FIG. 16, a second message is received at the first device that includes a second message sequence counter value, a second hash generated by the first encryption key, and any data that is being conveyed to the first device. At 1608, the first device is able to authenticate the message as being sent by the second device by confirming that the second message sequence counter value is greater than the first message sequence counter value and that the first encryption key used to generate the second hash is from the table of encryption keys generated during the most recent keying or rekeying operation. In some embodiments, the first device also checks to make sure the first encryption key is the same encryption key that was sent in previous messages. In the case the first encryption key is not the same but still contained within the encryption key table, the first device can still be authenticated when the message sequence counter value is confirmed to have been reset.

At 1610, a third message is received at the first device that includes a third message sequence counter value, a third hash generated by a second encryption key that is different from the first encryption key, and any data that is being conveyed to the first device. At 1612, the first device is able to authenticate the message as being sent by the second device by confirming that the second encryption key used to generate the third hash is included in the table of encryption keys and that the third message sequence counter value is lower than the second message sequence counter value. In some embodiments, the second encryption key must be determined to be the next encryption key in the table of encryption keys. As discussed above, changeover of the encryption keys is generally performed after a register used to track the message sequence counter value rolls over. However, other events such as a passenger swap out or other identified security risks could prompt the initiation of a rekeying operation. In some embodiments, the register is a 32-bit register that allows over four billion messages to be exchanged between the first and second devices before the message sequence counter value resets to one and a new encryption key is used to prevent the transmission of old messages to one of the devices, which could negatively affect performance of the autonomous vehicle. For example, in the case that the first device is a processor responsible for generating inputs to the various controls of the autonomous vehicle and the second device is a speed or velocity sensor, transmission of sensor data to the processor showing the autonomous vehicle at a significantly different speed than the speed being requested by the autonomous vehicle could result in the processor requesting a rapid correction be applied when little or no correction in actuality is needed. Such an action could result in an accident and possible injury of a passenger riding in the autonomous vehicle.

In the foregoing description, embodiments of the disclosure have been described with reference to numerous specific details that may vary from implementation to implementation. The description and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method for authenticating communications received from a first device of an autonomous vehicle by a second device of the autonomous vehicle, the method comprising:
 performing, using a processing circuit of the second device, a keying operation, comprising:
  exchanging randomly generated numbers with the first device; and
  generating a plurality of encryption keys using the randomly generated numbers, wherein the plurality of encryption keys comprise a first encryption key and a second encryption key, and are generated in each of the first device and the second device;
 receiving at the second device a first message including:
  a first message sequence counter value; and
  a first hash generated by the first device using the first encryption key of the plurality of encryption keys;
 after receiving the first message, receiving a second message at the second device that includes a second message sequence counter value and a second hash generated by the first device using the first encryption key;
 in accordance with a determination that the second message sequence counter value is greater than the first message sequence counter value and in accordance with a confirmation that the first encryption key used to generate the second hash is from the plurality of encryption keys generated during the keying operation, authenticating the second message as having been received from the first device;
 after receiving the second message, receiving a third message that includes a third message sequence counter value and a third hash generated by the first device using the second encryption key of the plurality of encryption keys; and
 in accordance with a determination that the third message sequence counter value is less than the second message sequence counter value and the second encryption key used to generate the third hash is different than the first encryption key, and in accordance with a confirmation that the second encryption key used to generate the third hash is from the plurality of encryption keys generated during the keying operation, authenticating the third message as having been received from the first device.

2. The method of claim 1, further comprising authenticating the randomly generated numbers during the keying operation by confirming a portion of the message accompanying the numbers corresponds with a key shared by both the first and second devices.

3. The method of claim 1, wherein the keying operation further comprises a keying communication and a keying response communication that are transmitted within discrete windows of time.

4. The method of claim 1, wherein performing the keying operation comprises initiating the keying operation by the second device.

5. The method of claim 1, wherein exchanging randomly generated numbers comprises sending, by the second device, a keying response communication to the first device in response to receiving, by the second device, a keying request communication from the first device, wherein the keying response communication comprises a first randomly generated number of the randomly generated numbers and a test message.

6. The method of claim 5, wherein exchanging randomly generated numbers comprises receiving, from the first device, a keying acknowledgement at the second device after sending the randomly generated number from the second device.

7. The method of claim 6, wherein the keying acknowledgement comprises a fourth hash generated by a third encryption key of the encryption keys and the test message.

8. The method of claim 1, wherein the first and second devices both independently generate the plurality of encryption keys during the keying operation.

9. The method of claim 1, wherein an unused one of the encryption keys is used each time a register of the message sequence counter resets.

10. The method of claim 1, wherein the first and second message sequence counter values are generated using a 32-bit register and the plurality of encryption keys comprises at least 255 encryption keys organized in a table.

11. The method of claim 1, wherein the plurality of encryption keys are regenerated in response to predetermined criteria.

12. The method of claim 1, further comprising ceasing communication between the first and second devices after receiving a threshold number of non-authenticated messages.

13. The method of claim 1, wherein the first device comprises a sensor configured to support navigation of the autonomous vehicle.

14. The method of claim 13, wherein the sensor is a velocity sensor or an object detection sensor.

15. The method of claim 1, wherein the first, second and third messages received from the first device at the second device are transmitted across a first channel and the second device is configured to transmit messages to the first device using a second channel that is discrete from the first channel and wherein the first and second devices are configured to perform independent rekeying operations for both the first channel and the second channel.

16. The method of claim 15, wherein the communications comprise sensor data pertaining to autonomous driving of the autonomous vehicle that are sent to the second device from the first device.

17. The method of claim 1, further comprising, in accordance with a determination that the second message sequence counter value is less than or equal to the first message sequence counter value, disregarding the second message.

18. The method of claim 17, wherein authenticating the third message is performed in accordance with a determination that the third hash was generated by the second encryption key and that the second encryption key is one of the plurality of encryption keys.

19. The method of claim 1, wherein the exchanging comprises:
transmitting, to the first device, the randomly generated numbers accompanied by a shared secret key that is known only to and stored in the first and second devices; and
authenticating the randomly generated numbers during the keying operation by confirming that the shared secret key accompanying the randomly generated numbers matches the shared secret key stored in the first and second devices.

20. The method of claim 1, wherein the randomly generated numbers comprise a first random number generated at the first device and a second random number generated at the second device, wherein performing the keying operation further comprises:
sending the second random number and a test message to the first device; and
responsive to receiving the second random number and the test message at the first device before expiration of a first window of time, generating a table that includes the plurality of encryption keys, based at least in part on the first and second random numbers.

21. A non-transitory computer-readable storage medium storing instructions configured to be executed by one or more processing circuits of a first device of an autonomous vehicle cause the first device to carry out steps comprising:
performing a keying operation, comprising:
exchanging randomly generated numbers with a second device of the autonomous vehicle; and
generating a plurality of encryption keys using the randomly generated numbers, wherein the plurality of encryption keys comprise a first encryption key and a second encryption key, and are generated in each of the first device and the second device;
transmitting to the second device a first message including:
a first message sequence counter value; and
a first hash generated by the first device using the first encryption key of the plurality of encryption keys;
after transmitting the first message and in accordance with a confirmation that the first encryption key is from the plurality of encryption keys generated during the keying operation, transmitting a second message to the second device, the second message comprising a second message sequence counter value that is greater than the first message sequence counter value and a second hash generated using the first encryption key; and
after transmitting the second message and in accordance with a confirmation that the second encryption key is from the plurality of encryption keys generated during the keying operation, transmitting a third message that comprises a third message sequence counter value that is less than the second message sequence counter value and a third hash generated using the second encryption key of the plurality of encryption keys that is different than the first encryption key.

22. An autonomous vehicle, comprising:
a first device having a first processing circuit;
a second device having a second processing circuit; and
memory storing one or more programs configured to be executed by the first and second processing circuits, the one or more programs including instructions for:
performing a keying operation, comprising:
  exchanging randomly generated numbers between the first device and the second device; and
  generating a plurality of encryption keys using the randomly generated numbers, wherein the plurality of encryption keys comprise a first encryption key and a second encryption key, and are generated in each of the first device and the second device;
transmitting to the second device using the first processing circuit a first message including a first message sequence counter value and a first hash generated using the first encryption key of the plurality of encryption keys;
receiving the first message at the second device;
after transmitting the first message, transmitting to the second device using the first processing circuit a second message that includes a second message sequence counter value that is greater than the first message sequence counter value and a second hash generated using the first encryption key;
receiving the second message at the second device;
in accordance with a determination by the second processing circuit that the second message sequence counter value is greater than the first message sequence counter value and in accordance with a confirmation that the first encryption key used to generate the second hash is from the plurality of encryption keys generated during the keying operation, authenticating the second message as having been received from the first device;
after transmitting the second message, transmitting to the second device using the first processing circuit a third message that includes a third message sequence counter value and a third hash generated using the second encryption key of the plurality of encryption keys; and
in accordance with a determination by the second processing circuit that the third message sequence counter value is less than the second message sequence counter value and the second encryption key used to generate the third hash is different than the first encryption key, and in accordance with a confirmation that the second encryption key used to generate the third hash is from the plurality of encryption keys generated during the keying operation, authenticating the third message as having been received from the first device.

* * * * *